(12) United States Patent
Li et al.

(10) Patent No.: US 8,170,589 B2
(45) Date of Patent: May 1, 2012

(54) MOBILE STATION AND APPLICATION SERVER FOR PROVIDING A SERVICE TO THE MOBILE STATION AND OPERATION METHODS FOR THE SAME

(75) Inventors: Stefan Li, Malmo (SE); Troed Sangberg, Malmo (SE)

(73) Assignee: Sony Ericsson Mobile Communications, Lund (SE)

( * ) Notice: Subject to any disclaimer, the term of this patent is extended or adjusted under 35 U.S.C. 154(b) by 486 days.

(21) Appl. No.: 12/325,674

(22) Filed: Dec. 1, 2008

(65) Prior Publication Data
US 2010/0137008 A1 Jun. 3, 2010

(51) Int. Cl.
*H04W 4/00* (2009.01)
(52) U.S. Cl. ........... 455/466; 455/412.2; 455/414.1
(58) Field of Classification Search .... 455/414.1–414.3, 455/404.1–404.2, 461, 463–466
See application file for complete search history.

(56) References Cited

U.S. PATENT DOCUMENTS

| | | | |
|---|---|---|---|
| 2003/0050080 A1* | 3/2003 | Uchimura | 455/466 |
| 2006/0167849 A1 | 7/2006 | Marcus et al. | |
| 2008/0082678 A1 | 4/2008 | Lorch et al. | |
| 2009/0005011 A1* | 1/2009 | Christie et al. | 455/412.2 |
| 2009/0054041 A1* | 2/2009 | Satake et al. | 455/412.2 |
| 2009/0054092 A1* | 2/2009 | Stonefield et al. | 455/466 |

FOREIGN PATENT DOCUMENTS

WO 2007086437 A1 8/2007

OTHER PUBLICATIONS

International Search Report, corresponding to PCT/EP2009/056224, mailed on Oct. 12, 2009.
Written Opinion of the International Searching Authority, corresponding to PCT/EP2009/056224, mailed on Oct. 12, 2009.

* cited by examiner

*Primary Examiner* — Kent Chang
*Assistant Examiner* — Keith Fang
(74) *Attorney, Agent, or Firm* — Renner, Otto, Boisselle & Sklar, LLP

(57) ABSTRACT

A mobile station, application server and wireless communication system are disclosed to provide for improved service related information distribution. The application server provides a service to a group of mobile stations, wherein the mobile stations comprise applications associated with the service. A communicating unit of the application server communicates with an application active on a mobile station and a determining unit determines another mobile station with an inactive application and the address of the other mobile station is provided to the mobile station. The mobile station comprises a communication section to receive the address of the other mobile station and comprises an SMS mailer causing an SMS message to be addressed to the other mobile station to start on the other mobile station the inactive application.

35 Claims, 7 Drawing Sheets

US 8,170,589 B2

MOBILE STATION AND APPLICATION SERVER FOR PROVIDING A SERVICE TO THE MOBILE STATION AND OPERATION METHODS FOR THE SAME

FIELD OF THE INVENTION

The present invention relates to a mobile station for use in a communication network, which mobile station comprises an application associated with a service, an application server for providing the service and methods for operating the mobile station and application server, respectively.

BACKGROUND

In the Internet, there are several services enabling users at a computer with internet connection to locate and connect to other users. For example, instant messaging clients, such as ICQ and MSN Messenger, provide inexpensive connections to other users, wherein these programs usually run in the background of a computer and cause a message window to pop up on a screen once a new message is obtained.

Recently more complex services have been introduced to Internet users, which also allow sharing photo albums or "wall" applications, where a user can post a photo or write a message, which is then published to the other users of the same group. In all such services a basic feature is the possibility of getting notified when the shared resource has been updated by other users. For example, in social networking websites, such as Facebook, wall applications are provided to each user or group of users, where a user may publish a photo so that the photo may be seen by other users, which belong to the same group or which are connected as friends. Further, users may be notified of changes on the "walls".

Notifying users of changes or updates is usually easy to do as long as an application keeps connected to an application server providing the service thus allowing the server to push out notifications. For example, in the Internet as long as the user is connected to a specific service of a website, the application server may constantly update the information of the website so that a user logged into his/her account can constantly receive updates.

However, receiving notifications and updates requires the application to stay alive at all times.

Currently, there is no comparable service and mechanism available for mobile phones. That is, sharing information or photos between users of a group is not easily possible. Existing services on mobile phones, such as short message service (SMS) and multimedia messaging service (MMS) enable to send information or photos to individual users, however, without the support of an application server managing different groups of users and their specific needs and interests.

Further, even if an application is provided on a mobile phone, which may connect to an application server providing a specific service, it is necessary that the application is active at all times. In contrast to applications running on a computer, applications running on a mobile phone do not regularly run in the background of the mobile phone, for example, due to memory and processor constraints.

Therefore, if users of the group are offline, i.e. the application of their mobile phone is not connected to the application server, these users are not notified, i.e. are not provided with updated information.

One alternative way to provide a user of mobile phone with updated information, when the application is inactive but the mobile phone is on, is to send an SMS to the user from the application server or from another user who has updated information.

However, sending information to a large number of mobile phones by SMS can be expensive and complicated for the user, especially since the user does not know which mobile phones have to be provided with the information. Namely the user does not necessarily know which other mobile phones belong to the same group or which other mobile phones have an inactive application and cannot receive information from an application server. Furthermore, most information may not be provided by simple SMS messages, such as photos or other multimedia content.

DISCLOSURE OF INVENTION

An improved mobile station and application server and methods for operating the same are presented.

An embodiment of the invention provides a mobile station for use in a communication network comprising an application server for providing a service to a group of mobile stations in the communication network, wherein the mobile station comprises an application associated with the service. The mobile station further comprises a communication section adapted to receive from the application server at least one address of at least one second mobile station of the group, in which second mobile station an application associated with the service is inactive, and an SMS mailer adapted to cause an SMS (short message service) message to be addressed to the at least one second mobile station to start on the at least one second mobile station the inactive application associated with the service upon receipt of the SMS message.

Accordingly, by receiving an SMS message at the second mobile station, an inactive application on the second mobile station can be started, which may provide a reliable way to wake up an inactive application of a second mobile station even when it is closed.

According to an advantageous example, the communication section is adapted to receive at least one of the at least one address and service related information via a packet switched network communication between the mobile station and the application server.

According to another advantageous example, the packet switched network communication between the mobile station and the application server is configured to connect the application of the mobile station to the application server.

According to another advantageous example, the SMS mailer is adapted to receive an SMS message configured to start the application of the mobile station to enable the mobile station to use packet switched network communication with the application server to obtain at least one of the at least one address and the service related information from the application server.

According to another advantageous example, the communication section is adapted to transmit service related information to the application server.

According to another advantageous example, the communication section is adapted to receive from the application server a plurality of addresses of mobile stations of the group, in which plurality of mobile stations an application associated with the service is inactive; and the mobile station further comprises a selector for selecting from the plurality of addresses an address of a mobile station of the plurality of mobile stations; wherein the selected address preferably corresponds to the address of the second mobile station.

According to another advantageous example, the SMS mailer is adapted to cause an SMS message comprising the plurality of addresses of mobile stations without the selected address to be sent to the second mobile station.

According to another advantageous example, the communication section is adapted to receive from the application server at least two addresses of the at least second and a third mobile station of the group, in which second and third mobile stations the application is inactive, and the SMS mailer is adapted to cause the SMS message to be addressed to the at least second and third mobile stations according to the at least two addresses to start on the at least second and third mobile stations the applications associated with the service.

According to another advantageous example, the SMS message comprises service related information managed by the application server.

According to another advantageous example, the SMS message is a SMS control message comprising control information for starting the application upon receipt of the message.

According to another advantageous example, the application is connectable to the application server to provide for a client server communication via a packet switched network.

According to another advantageous example, the mobile station further comprises a controller adapted to determine whether the received SMS message comprises control information and to load the application in a memory of the mobile station, if control information is present, to start the application.

According to another embodiment, an application server for providing a service to a group of mobile stations in a communication network is provided. The application server comprises a communicating unit for communicating with an application active on a first mobile station of the group and associated with the service. Additionally, the application server comprises a determining unit for determining at least one second mobile station from the group of mobile stations, in which at least one second mobile station an application associated with the service is inactive, and a providing unit for providing at least one address of the at least one second mobile station to the first mobile station using the communicating unit.

Accordingly, the application server may cause an application on a second mobile station to be started by communication with the first mobile station so that the application server may not need to contact the second mobile station directly, for example, by SMS.

According to another advantageous example, the communicating unit is adapted to receive service related information and the providing unit is adapted to provide the at least one address in response thereto.

According to another advantageous example, the determining unit is adapted to determine the at least one second mobile station based on at least one of a specific protocol, previous active times of the application of a mobile station of the group, number of previously sent SMS messages by a mobile station and distribution of sent SMS messages between the mobile stations of the group.

According to another advantageous example, the communicating unit is adapted to receive a confirmation confirming receipt of the at least one address at the first mobile station, and the providing unit is adapted to provide the at least one address of the at least one second mobile station to another mobile station using the communicating unit, if no confirmation is received.

According to another embodiment, a wireless communication system is provided comprising a mobile station having some of the above described mobile station features as well as an application server having some of the above application server features.

According to another embodiment, a method for operating a mobile station in a communication network comprising an application server providing a service to a group of mobile stations is provided, wherein each mobile station comprises an application associated with the service. The method comprises receiving at a first mobile station from the application server at least one address of at least one second mobile station of the group, in which second mobile station the application associated with the service is inactive, and causing an SMS message to be addressed to the at least one second mobile station to start on the at least one second mobile station the inactive application associated with the service upon receipt of the SMS message.

Accordingly, a second mobile station with an inactive application may be determined and an SMS message is addressed to the second mobile station to start the inactive application so that the application of the second mobile station may communicate with the application server.

According to an advantageous example, the method further comprises receiving at least one of the at least one address and service related information via a packet switched network communication between the first mobile station and the application server.

According to another advantageous example, the method further comprises connecting the application of the first mobile station to the application server using the packet switched network communication.

According to another advantageous example, the method further comprises receiving an SMS message at the first mobile station, and starting the application of the first mobile station in response to the received SMS message.

According to another advantageous example, the method further comprises starting the application of the at least one second mobile station upon receipt of the SMS message at the second mobile station.

According to another advantageous example, the method further comprises carrying out packet switched network communication between the application server and at least one of the first and second mobile stations to connect the application to the application server after starting the application, and receiving service related information from the application server by using the packet switched network communication.

According to another advantageous example, the method further comprises requesting the application server to send at least one of service related information or the at least one address.

According to another advantageous example, the method further comprises receiving at the first mobile station from the application server at least two addresses of the at least one second mobile station and a third mobile station of the group; and the method further comprises causing SMS messages to be sent until at least one SMS message has been sent to all received addresses of mobile stations.

According to another advantageous example, the SMS message is a SMS control message comprising information for starting the application upon receipt of the message.

According to another advantageous example, the application is connectable to the application server to provide for a client server communication via a packet switched network.

According to another advantageous example, starting the application comprises determining whether the received SMS message comprises control information and loading the application in a memory of the first mobile station, if control information is present.

According to another embodiment, a method for operating an application server providing a service to a group of mobile stations in a communication network is provided. The method comprises communicating with an application active on a first mobile station of the group and associated with the service, determining at least one second mobile station from the group of mobile stations, in which at least one second mobile station an application associated with the service is inactive, and providing at least one address of the at least one second mobile station to the first mobile station by communicating with the active application.

Accordingly, a method may be provided in which the application of the second mobile station may be started without directly contacting the second mobile station by the application server.

According to another embodiment, a method for operating a wireless communication system is provided comprising operating a mobile station according to at least some of the above mentioned operations of the mobile station and operating an application server according to at least some of the above mentioned operations of the application server.

According to another embodiment, a computer program product is provided which, when loaded into a program memory of a processor or microcontroller, causes the processor or microcontroller to carry out at least one of the methods described above.

DETAILED DESCRIPTION OF THE PREFERRED EMBODIMENTS

Preferred embodiments of the invention are described with reference to the figures. It is noted that the following description contains examples only and should not be construed as limiting the invention.

Embodiments of the invention generally relate to communication between mobile stations and an application server in a communication network, in which the application server provides a service to a group of mobile stations, and in particular to a mobile station for use in a communication network and comprising an application associated with a service of the application server as well as an application server for providing the service to a group of mobile stations in the communication network.

In more detail, a mobile station receives an address of another mobile station with an inactive application and causes a short message service (SMS) message to be sent to the other mobile station to start the inactive application. The application server determines the inactive applications on different mobile stations in the communication network and accordingly provides the necessary addresses to one or more mobile stations with an active application. Briefly said, the application server may trigger a first mobile station to wake up an application, which is inactive on a second mobile station.

In a specific example, which will be described in detail below, a first mobile station may communicate via GPRS with an application server to send and receive information including a request from the application server to send an SMS message to a second mobile station to start an application on the second mobile station so that the application server may also communicate via GPRS (general packet radio services), for example, with the application of the second mobile station.

A mobile station in the context of the disclosure may be a mobile or cellular phone or the like supporting a communication standard such as GSM, UMTS, AMPS, etc.

Figure 1:
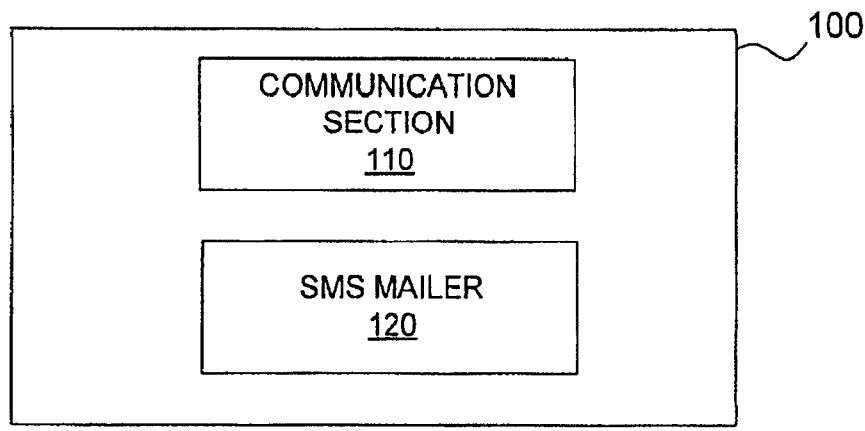
FIGS. 1 and 1A illustrate elements of a mobile station according to an embodiment of the invention.

FIG. 1 illustrates elements of a mobile station 100 according to an embodiment of the invention, comprising a communication section 110 and an SMS mailer 120.

The mobile station 100 may be used in a communication network, such as the communication network described later with respect to FIG. 3, which comprises an application server for providing a service to a group of mobile stations, such as mobile stations MS1, MS2, MS3, MS4, MS5 and MS6 in FIG. 3. Further, the mobile station 100 comprises an application associated with the service.

For example, the service may be a "wall" application where messages for all mobile stations users of the group may be posted. Specifically, the service may be a traffic information service and an associated application may be a traffic information application communicating with the service on the application server, wherein all users subscribed to this service may be informed of traffic jams on a certain route. Hereby, information regarding a traffic jam may be uploaded to the application server and each mobile station with an active application may be able to receive the traffic jam information.

The communication section 110 of the mobile station receives from the application server an address of another mobile station, which will be called a second mobile station in the following. The second mobile station may belong to the same group and comprise an inactive application associated with the service.

For example, the application of the mobile station is connectable to the application server to provide for a client server communication via a packet-switched network. For communication and to establish a connection to the application server, the application has to be running so that the address may be received via a packet-switched network by the communication section 110.

This concept is clearly not limited to receiving only one address of a second mobile station but also two addresses of two mobile stations of the group or multiple addresses of multiple mobile stations may be received at the mobile station. For example, the addresses may be provided in a list and then the list is received at the communication section 110. It is also feasible that the list includes not only addresses of mobile stations with inactive applications, since the addresses of mobile stations with inactive applications on the list could be marked or highlighted to be distinguishable from the addresses of mobile stations with active applications.

An inactive application may be an application that is currently not running and thus the application is not connected to the application server. Further, an inactive application does not request service related information, such as traffic jam information or addresses from the application server.

The SMS mailer 120 causes a SMS (short message service) message to be addressed to the second mobile station to start on the second mobile station the inactive application associated with the service upon receipt of the SMS message.

The short message service forwarding short messages is generally known in the art and thus will be explained only briefly. Conventionally, a user of a mobile station sends a short message over the air interface to a serving mobile switching center (MSC) or a serving GPRS support node (SGSN), and the short message is then forwarded to a short message service center (SMSC). The short message comprises some form of text and a destination address of the receiving mobile station. According to this address, the SMSC forwards a short message to an MSC or SGSN of the receiving mobile station, which then forwards it to the receiving mobile station.

Therefore, in a simple case the SMS mailer sends out the SMS message via a network including an SMSC to the second mobile station. However, the above described flow of a short message relates to the GSM network and there may be other networks which deal with short messages differently. It may be feasible that the SMS mailer sends out basic information necessary to generate a short message or SMS message, such as text and a destination address, which will then be converted in the network, for example by an SMSC, to an SMS message as understood in the GSM context. For reasons of simplicity, GSM or GPRS networks are assumed so that according to the language used for these networks, the SMS mailer may send out an SMS message to another mobile station.

In a specific embodiment, the SMS message may be a SMS control message comprising control information for starting the application upon receipt of the message. For example, the SMS message may comprise code acting as control information when received by a second mobile station so as to trigger that an inactive application in the second mobile station is loaded in a memory, such as a RAM, of the mobile station to execute the application by the CPU of the mobile station.

Figure 2:
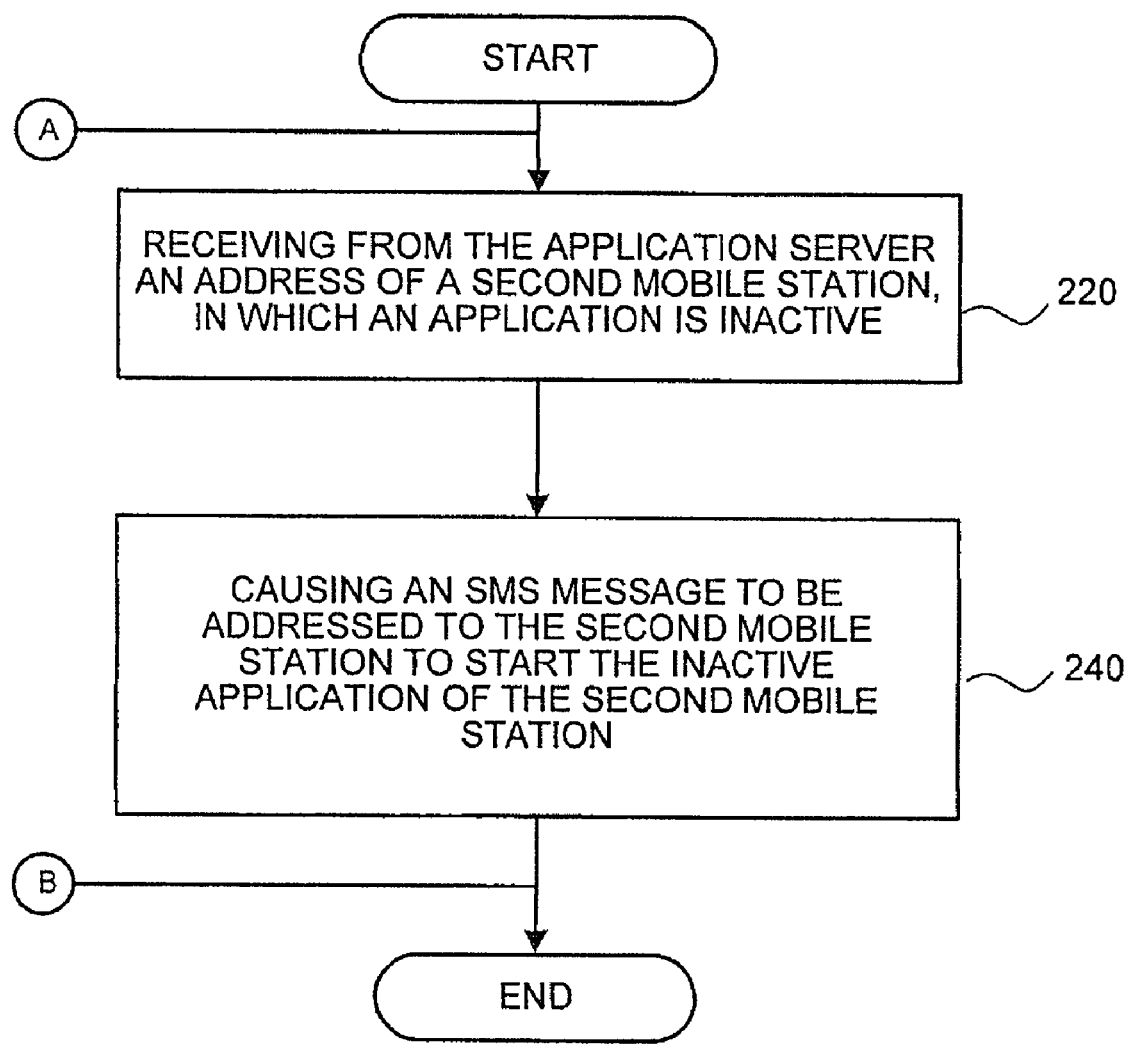
FIG. 2 illustrates operations of a method for operating a mobile station according to an embodiment of the invention.

In the following, operations of a mobile station will be described with regard to FIG. 2. FIG. 2 illustrates a flow diagram of operations of a method for operating a mobile station, e.g. the mobile station 100 of FIG. 1.

As described above, the mobile station, in which the operations are executed, may be located in a communication network that comprises an application server providing a service to a group of mobile stations. Each of the mobile stations of the group comprises an application associated with the service, however, some of the applications may be active and some of the applications may be inactive so that the application server may not easily communicate with all mobile stations using a client server communication via a packet-switched network, for example.

In operation 220 a first mobile station, which may be above described mobile station 100 or mobile station MS1 which will be described later with respect to FIG. 3, receives from the application server an address of a second mobile station in which the application is inactive. For example, the first mobile station comprises an active application associated with the service provided by the application server and thus enabling the application to be connected to the application server. In detail, the communication section 110 may receive the address via a packet-switched network communication between the mobile station and the application server.

Then, after receipt of the address at the first mobile station, the first mobile station causes, as shown in operation 240, an SMS message to be addressed to the second mobile station to start the inactive application of the second mobile station.

In a simple example, in a GSM network, the SMS message may be generated in the first mobile station, e.g. by the SMS mailer 120, and the SMS message is then forwarded to the network, i.e. to the MSC and then to the SMSC to be forwarded to the second mobile station, which may be located in a different network, via the same or another MSC, respectively.

Therefore, in contrast to the communication between mobile stations, which is performed via an SMS message, the communication with the application server is preferably carried out by connecting an active application of a mobile station to the application server, e.g. the communication section 110 communicates via a packet-switched network communication, which is preferably IP based, with the application server.

In other words, packet-switched network communication between the mobile station and the application server may be configured to connect the application of the mobile station to the application server, thereby the active application may establish client server communication via a packet-switched network, for example via GPRS, with the application server.

It is appreciated that the communication section 110 may also receive more than one address of a second mobile station. For example, two or three addresses of a second mobile station, third mobile station and a fourth mobile station, which have inactive applications, may be received and in response to receiving the address or addresses, the SMS mailer 120 causes one or more SMS messages to be addressed to the different mobile stations to start their inactive applications.

Figure 3:
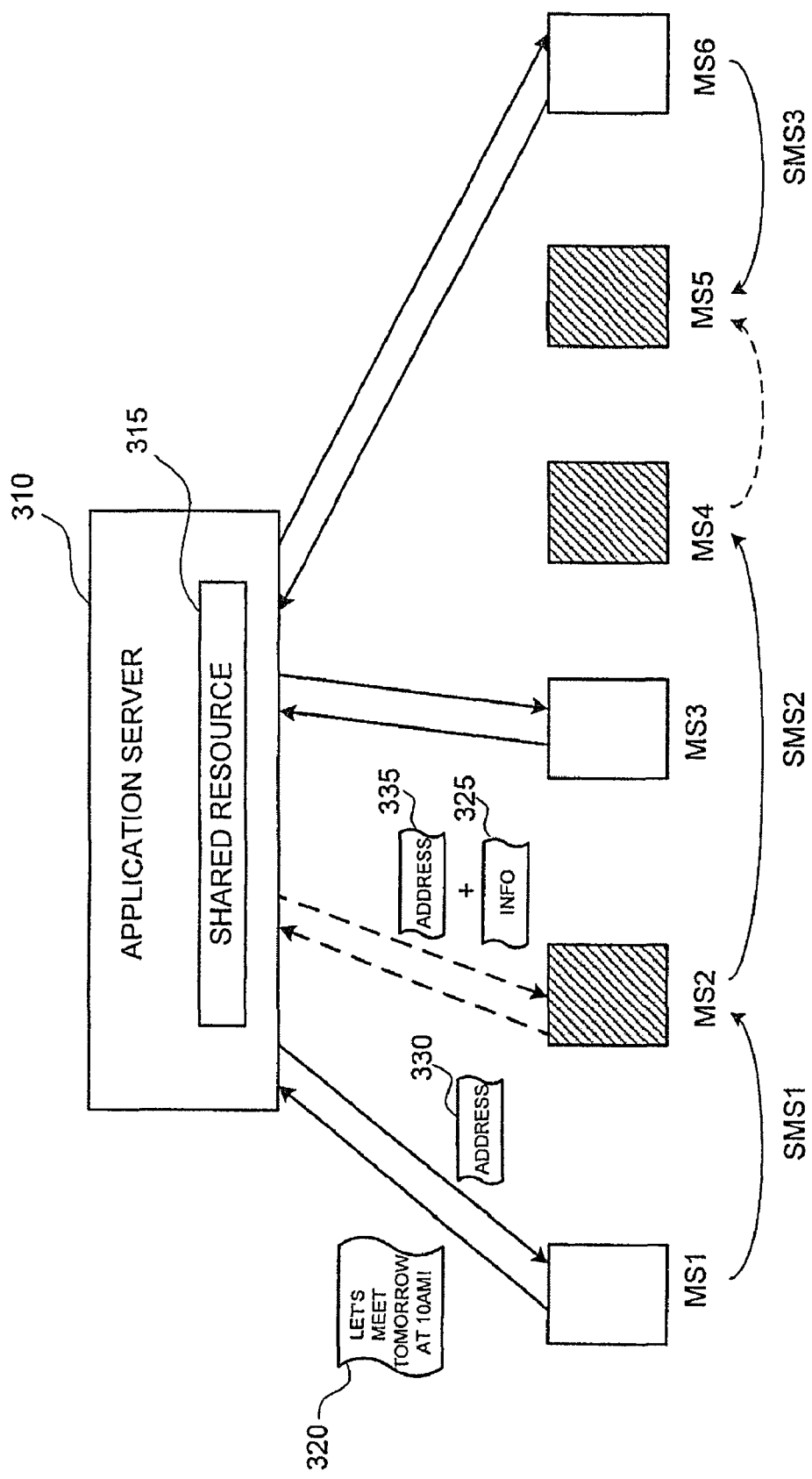
FIG. 3 illustrates a wireless communication system comprising an application server and multiple mobile stations, and particularly illustrates communication between individual mobile stations and communication between individual mobile stations and an application server, according to a specific embodiment of the invention.

FIG. 3 illustrates elements of a wireless communication system, in which the above described mobile station 100 may be used. In detail, the wireless communication system of FIG. 3 comprises an application server 310 and several mobile stations MS1 to MS6.

In the embodiment described with respect to FIG. 3, the application server 310 provides a service to the mobile stations MS1 to MS6. All mobile stations MS1 to MS6 comprise an application associated with the service of the application server, and thus constitute a group of mobile stations in a communication network which have a specific service in common. For example, the service may be associated with a shared resource providing information desired by all users of mobile stations MS1 to MS6. The shared resource may be a photo album or wall application, as described above, or may provide information about traffic conditions or the like.

As described above, each mobile station of the group comprises an application, which may be active or inactive. The mobile stations with an inactive application may not receive information or request information from the application server.

In FIG. 3 the mobile stations with an inactive application are indicated by hatching, i.e. MS2, MS4 and MS5 are assumed to have inactive applications. Therefore, there is currently no communication between these mobile stations and the application server. In detail, the application server may not provide MS2, MS4 and MS5 with updates on the shared resource, e.g. when a user of a mobile station with an active application, such as MS1, posts new information for the other users of the group on the shared resource 315 of the application server 310.

Figure 4A:
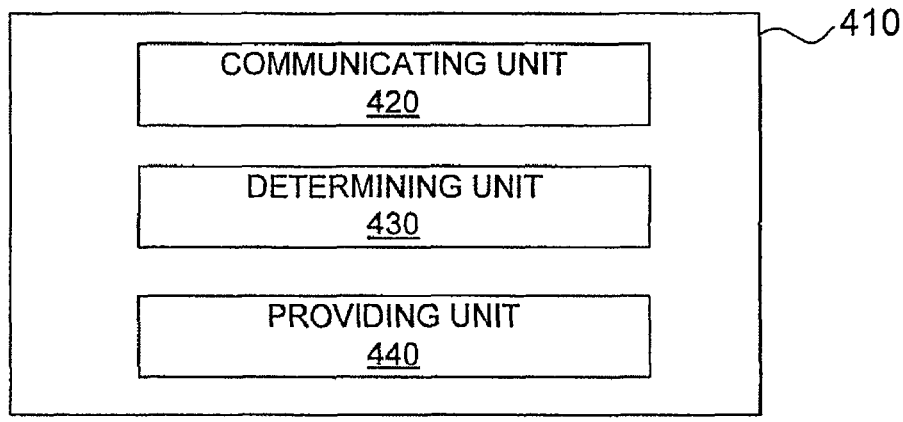
FIG. 4A illustrates elements of an application server according to another embodiment of the invention.
Figure 4B:
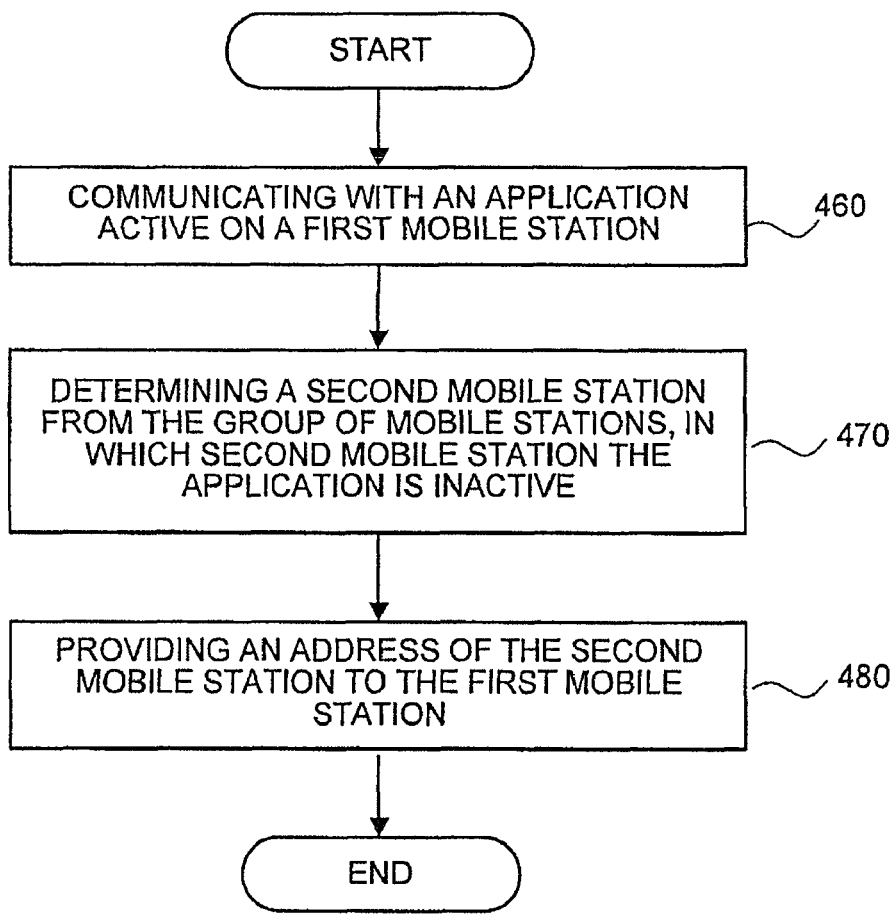
FIG. 4B illustrates operations of a method for operating an application server according to another embodiment of the invention.

The structure and functions of the application server 310 are now described in detail with respect to FIGS. 4A and 4B.

FIG. 4A illustrates elements of an application server 410, which may be the same as application server 310 of FIG. 3. The application server 410 comprises a communicating unit 420, a determining unit 430 and a providing unit 440.

To enable communication with a mobile station having an active application, the communicating unit 420 is provided which communicates with the application active on the mobile station, such as mobile station MS1 of FIG. 3, which corresponds to operation 460 of FIG. 4B.

Further, in operation 470 of FIG. 4B, a second mobile station of the group of mobile stations is determined, in which an application is inactive. For example in FIG. 3 the determining unit 430 of the application server 310, 410 may determine that mobile stations MS2, MS4 and MS5 have inactive applications, since a client server communication via a packet-switched network or similar is not established, for example, or because they simply cannot be reached by the application server trying to communicate with these mobile stations.

The application server 310, 410 may store addresses of the mobile stations of the group in an internal memory so as to determine a corresponding address of a mobile station with an inactive application. Such an address may be any kind of unique mobile station identifier for identifying the mobile station in the network, such as an MSISDN, the mobile subscriber integrated services digital network number related to the telephone number of a SIM card in a mobile or cellular phone.

Then, in operation 480 the address of one of the mobile stations with inactive application, e.g. of the second mobile station, MS2, may be provided to the first mobile station by the providing unit 440 of the application server.

In the following, details of the interactions between the mobile stations and the application server 310 will be described by referring back to FIG. 3.

In FIG. 3 the communication section 110 of the mobile station MS1 send service related information 320 to the application server. Preferably, this is performed via packet-switched network communication between the mobile station MS1 and the application server 310. The service related information 320 may be in form of a text which is to be posted on the shared resource. For example in FIG. 3 the text may comprise information for all mobile stations of the group, such as an invitation "Let's meet tomorrow at 10 am!" in FIG. 3. It is clear that mobile stations MS2, MS4 and MS5, which do not communicate with the application server 310, do not receive the invitation and thus the users of these mobile stations may not get to that appointment in time.

Alternatively, the SMS mailer of MS1 may send an SMS message comprising the service related information 320, such as the invitation "Let's meet tomorrow at 10 am!" to the application server, if it is possible to send the information by SMS.

Therefore, it is desirable to be able to activate or start the applications of mobile stations MS2, MS4 and MS5. In other words, it is desirable to be able to wake up the applications of the mobile stations even when they are closed, which may be done by sending a push-SMS message to a port of the mobile station associated with the application.

However, sending out SMS messages to all mobile stations with inactive applications may be costly and complex, if all SMS messages have to be sent by either the mobile station MS1 or the application server 310 so that it is desirable to distribute the sending of SMS messages between other mobile stations of the group, i.e. to distribute the load and the cost of waking up the mobile stations that are not online among the users of the group.

Therefore, after publishing service related information 320 to the application server from the user of MS1, the determining unit 430 of the application server 310, 410 determines that the application of mobile station MS2 is inactive and provides the address 330 of mobile station MS2 to mobile station MS1, e.g. using the communicating unit, as shown in FIG. 3.

For example, the communicating unit of the application server 310 may be adapted to receive the service related information and the providing unit may be adapted to provide the address in response thereto using the communicating unit to communicate with the mobile station MS1.

Subsequently, the communication section 110 of the mobile station MS1 receives the address and the SMS mailer causes an SMS message to be addressed to mobile station MS2. For example, the SMS mailer generates an SMS message or other kind of short message information that may be converted by a SMSC or other unit of the network to an SMS message to be forwarded then to the mobile station MS2.

In FIG. 3, the SMS message sent from mobile station MS1 to mobile station MS2 is referenced as SMS1. Although FIG. 3 shows that SMS1 is sent directly from mobile station MS1 to mobile station MS2, this is only for illustration, and the skilled person appreciates that conventionally SMS messages are sent via a network, such as one or more public land mobile networks (PLMN), to the mobile station MS2.

Once SMS1 is received at mobile station MS2, for example by an SMS mailer of mobile station MS2, the inactive application of the mobile station MS2 is started. Here, the mobile station MS2 may have the same configuration as the mobile station MS1, namely the configuration of mobile station 100 described previously with respect to FIG. 1.

In detail, the SMS mailer of MS2 receives SMS1 which may be configured to start the application of the mobile station MS2 to enable the mobile station MS2 to use packet-switched network communication with the application server to obtain the service related information or another address of another mobile station with an inactive application or both. Therefore, the communication section of mobile station MS2 may have the capability for packet-switched network communication with the application server, for example to retrieve service related information 325 from the application server, and the SMS mailer of mobile station MS2 may have the capability for SMS reception.

Figure 5A:
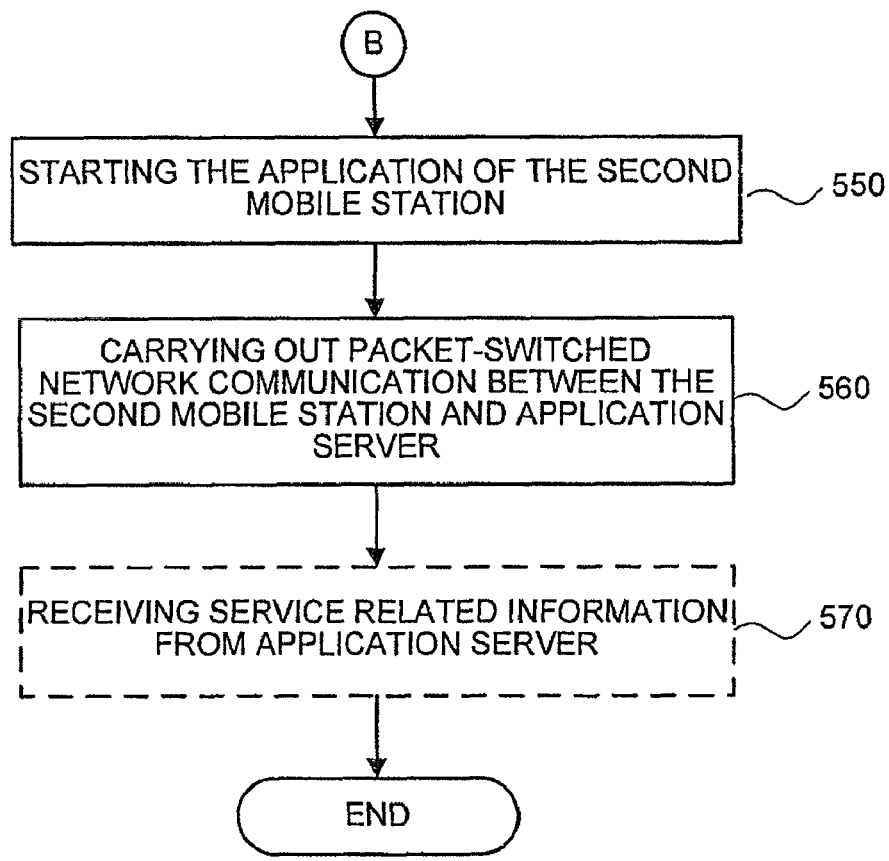
FIGS. 5A and 5B illustrate operations of modifications of the method shown in FIG. 2.

The above described operations at mobile station MS2 are illustrated in FIG. 5A as an overview.

In operation 550, which may be performed after the operations of FIG. 1 as indicated, the application of the second mobile station MS2 is started and in operation 560 packet-switched network communication between the second mobile station MS2 and the application server 310 is carried out. Then, the mobile station may request from the application server service related information, another address of a mobile station with an inactive application or both. Subsequently, service related information or the address may be received from the application server which is shown as an optional operation 570 in FIG. 5A.

A mobile station, such as MS1 or MS2, may also comprise a controller to determine whether the received SMS message comprises control information. As discussed above, the SMS message may be an SMS control message comprising control information to start an application upon receipt of the message. In detail, in the example described with respect to FIG. 3, the controller of mobile station MS2 may, after detecting the control information, load the application of MS2 in a memory of the mobile station MS2 so that a processor or microcontroller of the mobile station may execute the application.

Once the application of mobile station MS2 is started, the application and the application server may be connected, for example using packet-switched network communication, i.e. the communicating unit of the application server communicates with the communication section of the mobile station. Then, service related information 325, for example the one previously posted by the mobile station MS1, may be received via the packet-switched network communication between the mobile station MS2 and the application server.

Furthermore, an address 335 may also be received by the communication section of the mobile station MS2 indicating another mobile station with an inactive application.

Similar to the above, the application server 310, and in particular the determining unit 430 may determine another mobile station, such as mobile station MS4, in which an application associated with the service is inactive.

The determining unit 430 of the application server 310, 410 may determine the mobile station with an inactive application which is to be started next, i.e. which address is sent to a mobile station with an active application, such as MS1, for example, based on the following consideration.

For example, a specific protocol may be followed according to which a first mobile station, such as MS1, has to wake up or start the inactive application of a mobile station with a subsequent number or next higher number, such as MS2, and after the application of MS2 is started a SMS2 is sent to MS4. That is, the address 335 provided by the application server 310 to the mobile station MS2 may be the address of MS4 so that chaining of SMS messages according to the specific protocol may be achieved.

Furthermore, determination of the mobile station with an inactive application, which is to be started next, may also be based on previous active times. For example, the user of a mobile station in which the application was active for a long time previously may value the service more so that it may be first informed about an update in service related information. In another example, the number of previously sent SMS messages by a mobile station can be evaluated, and if a mobile station only sent out few SMS messages previously, the user of that mobile station should also participate in the costs of the group. Similarly, the distribution of sent SMS messages between mobile stations of the group may also be taken into consideration when determining the mobile station with an inactive application which is to be started next, i.e. the address of that next mobile station which is sent to the mobile station to trigger the sending of an SMS message to the next mobile station.

For example, as described above, the address 330 sent to mobile station MS1 in FIG. 3 is the address of mobile station MS2, and once the application in mobile station MS2 is started the mobile station MS2 may receive service related information 325 as well as an address of the next mobile station, such as mobile station MS4, to which MS2 sends another SMS message, SMS2, to start the application of mobile station MS4.

Similar considerations regarding determination may also apply to the determination of the mobile station with an active application, to which the address is sent from the application server, i.e. MS1, MS3 or MS6. For example, balance checks and distribution of previously sent SMS messages, etc. may be used to determine the mobile station with an active application that receives an address so that the load on the system may be distributed equally. In a specific example, which will be described in more detail below, mobile station MS6 may be determined to send an SMS message to MS5 and not necessarily MS4 which would be in a position of the chain of FIG. 3 to send out an SMS message to MS5.

As described above, the application server 310 may determine and dynamically calculate the routing of SMS messages so that all inactive applications on the mobile stations of the group can be activated and thus receive the desired service related information.

As previously described, the mobile stations MS3 and MS6 comprise active applications and may thus communicate with the application server 310 as indicated by the arrows in FIG. 3. Therefore, also mobile stations MS3 and MS6 may be used as some type of relay station to start the inactive applications of other mobile stations.

For example, as indicated in FIG. 3, mobile station MS6 may receive the address of mobile station MS5, similar to the above discussion, and may send an SMS3 to mobile station MS5 to start the application of mobile station MS5.

Alternatively, as shown by the dashed arrow, it may also be possible that after the application of MS4 is started by SMS2 that MS4 sends an SMS message to mobile station MS5. Which station to chose may be based on similar considerations as above mentioned regarding mobile stations with an inactive application which is to be started next, namely for example a specific protocol, etc.

Further, circumstances may arise which prevent a mobile station with an active application to send out an SMS message even though it receives an address. Therefore, the application server has to provide some kind of redundancy to not interrupt the chain of SMS messages. For example, the mobile station receiving the address may send out a confirmation of receipt, which may then be received by the communicating unit 420 confirming receipt of the address at the mobile station and, if desired, also sending of an SMS message to this address.

Further, the providing unit 440 may provide, if no confirmation is received, for example within a predetermined period of time, the address of the mobile station with an inactive application to another mobile station using said communication unit. To enable such a function, the providing unit may be equipped with a timer to track the time elapsed after providing an address to a mobile station, and after a certain period of time without confirmation, just resend the address. For example, if the application server 310 does not receive a confirmation from MS6, the application server considers SMS3 as not sent, and may require the mobile station MS4 to send an SMS to mobile station MS5.

Figure 5B:
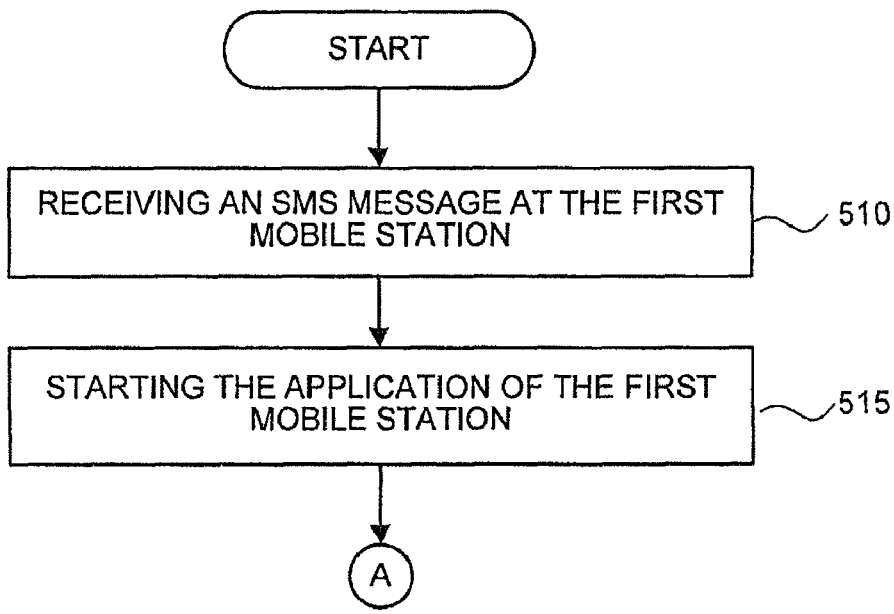

Previously it has been assumed that the application of mobile station MS1 is active. However, the same concept explained with respect to the second mobile station MS2 may also be applied to mobile station MS1 if its application is inactive. That is, mobile station MS1 may receive an SMS message, as shown in operation 510 of FIG. 5B, to start its application in response to the received SMS message, as shown in operation 515 of FIG. 5B. Once the application of the mobile station MS1 is started and active, the application may be connected to the application server to provide for client server communication via a packet-switched network, for example, as described above. Subsequently, the operations shown in FIG. 1 may be performed.

Previously in FIG. 3 it has been described that one address at a time is forwarded to one mobile station. However, it is appreciated that also two or more addresses may be sent at one time.

For example, the communication section of the mobile station MS1 may receive two addresses of the second mobile station MS2 and of a third mobile station, such as MS4, from the application server. Accordingly, the SMS mailer may cause two SMS messages to be addressed one to the second mobile station and one to the third mobile station according to the two addresses so that the applications on the second and third mobile stations can be started at roughly the same time. Therefore, notifying all mobile stations of the group will be speeded up due to a reverse pyramid scheme, which will be described in more detail later with respect to FIG. 6.

In another specific embodiment, a plurality of addresses may be sent from the application server and received by the communication section of a mobile station with an active application. It is assumed that the plurality of addresses belongs to a plurality of mobile stations with inactive applications.

Figure 1A:
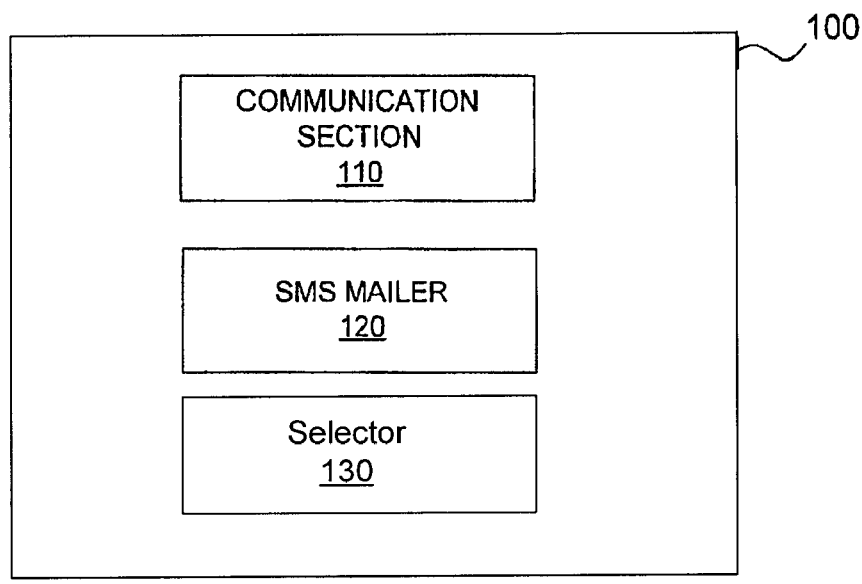

As an alternative to sending a plurality of SMS messages to the plurality of addresses, the mobile station may be provided with a selector 130 (see FIG. 1A) for selecting an address of a mobile station from the plurality of addresses. Subsequently, the SMS mailer of the mobile station may send an SMS message to the mobile station with a selected address. Together with the SMS message, e.g. in the same SMS message or an associated second one, the SMS mailer may send the plurality of addresses not including the selected address, i.e. the plurality of addresses reduced by one, namely the selected address, to the mobile station with the selected address. As described above, the addresses may also be provided in form of a list so that a list of addresses may be sent to the mobile station.

In this case, the mobile station with the selected address does not need to consult the application server to obtain an address of the next mobile station with an application which has to be started next. Namely, in this case, the mobile station with the selected address already is provided with addresses of other mobile stations with inactive applications so that it can directly send out an SMS message to one or more of the plurality of addresses.

Specifically, the first mobile station may receive from the application server at least two addresses of the second mobile station and a third mobile station of the group, and then causes SMS messages to be sent until at least one SMS message has been sent to all received addresses of mobile stations.

In the following, a wireless communication system including mobile stations and an application server according to another embodiment of the invention is described with respect to FIG. 6.

Figure 6:
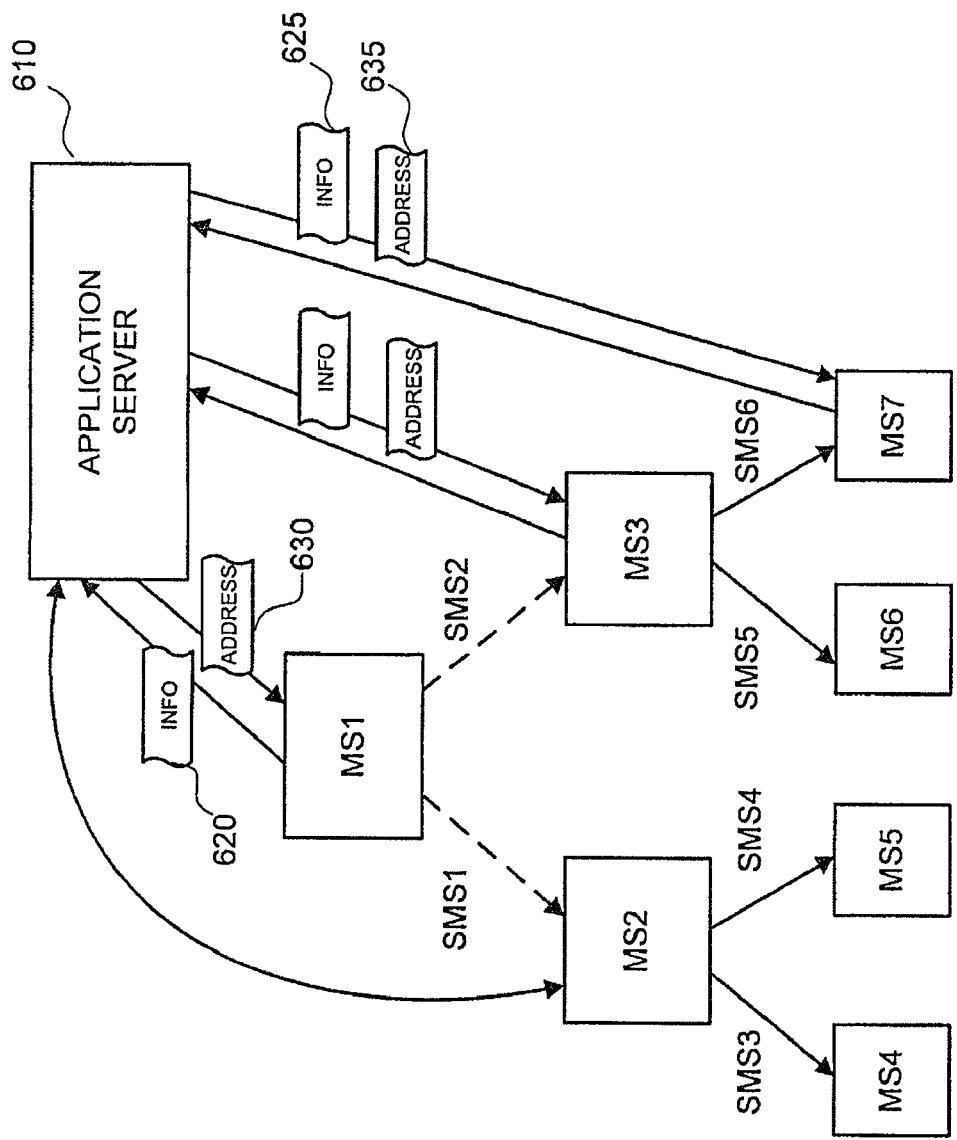
FIG. 6 illustrates mobile stations in a wireless communication system communicating with each other and an application server according to a specific embodiment of the invention.

The mobile stations shown in FIG. 6 carry out messaging in a reverse pyramid scheme, as described above. The application server 610 may be an open server similar to the application servers 410 and 310 allowing third party applications to plug in their functionality. Third party applications may be wall applications, photo albums, as described above, etc., and are not limited thereto. FIG. 6, for example, will be described with respect to a traffic information application.

For example, the users of mobile stations MS1 to MS7 form a group interested in traffic conditions on a certain highway. Here, mobile station MS1 may send traffic information 620 to application server 610 as an SMS message via the SMS mailer or as a data packet via the communication section using packet-switched network communication, such as GPRS, for example.

In response to receiving the service related information 620, such as traffic information, the application server 610 may notify other mobile stations interested in that information. For example, the application server 610 may provide the mobile station MS1 with two addresses of two mobile stations MS2 and MS3, which belong to the same group related to the traffic information service so that the mobile station MS1 may send two SMS messages, SMS1 and SMS2, to mobile stations MS2 and MS3, respectively, to start their application, i.e. to enable MS2 and MS3 to request and/or obtain at least one of service related information and one or more addresses from the application server 610.

In the specific example of FIG. 6, the communication section of mobile station MS1 receives two addresses 630 of the second and third mobile stations MS2 and MS3, in which the application is inactive. Then, the SMS mailer of mobile station MS1 causes an SMS message SMS1 to be addressed to the second mobile station MS2 and an SMS message SMS2 to be addressed to the third mobile station MS3 according to the two addresses to start the applications on the second and third mobile stations.

Once the applications are started, they may connect to the application server to receive service related information and addresses of other mobile stations which should be informed. Alternatively, it may be feasible that the service related information can be included in the SMS message itself.

From the previous discussion, it is clear that the two SMS messages, SMS1 and SMS2, sent from mobile station MS1 are not necessary if the mobile stations MS2 and MS3 already comprise an active application that may directly obtain service related information from the application server.

One way or the other, the active applications of mobile stations MS2 and MS3 may then be connected to the application server using packet-switched network communication, for example, to each obtain two additional addresses of mobile stations, e.g. MS4 and MS5 as well as MS6 and MS7, respectively.

Subsequently, mobile station MS2 may send out two SMS messages, SMS3 and SMS4, to mobile station MS4 and mobile station MS5, respectively, and mobile station MS3 may send out two messages, SMS5 and SMS6, to mobile stations MS6 and MS7, respectively. Similar to the above discussion regarding mobile stations MS2 and MS3, the applications of the mobile stations MS4, MS5, MS6 and MS7 may then be connected to the application server to receive traffic related information, addresses of further interested mobile stations or both. This is shown representatively for mobile station MS7 receiving the service related information 625 and the addresses 635.

Independent of whether the first two SMS messages SMS1 and SMS2 are sent from mobile station MS1 or, which is also possible, are directly sent from the application server 610 to MS2 and MS3, a cascade of messages will be triggered to quickly send out notification of new service related information, such as traffic information, to several mobile stations.

According to this reverse pyramid scheme the cost involved for receiving updated traffic information is basically the costs of two SMS messages. Further, it may be possible, as an incentive for the user of the first mobile station MS1 to send the traffic information, to let that cost lie with the provider of the application server. Therefore, this scheme may work for all cases where a user of an information receiving mobile station values the service more than the cost of sending two SMS messages.

This scheme is clearly applicable to a wide range of services and is not limited to sending two SMS messages but also three or more are possible. Further, it is also possible that in a first step two SMS messages are sent and then the two receiving mobile stations send out three SMS messages each. Thereby, "citizen journalism" may be brought even closer to the actual user of a mobile station at the same time as the users are in charge of reporting.

Implementation may be performed using available technology, such as client applications in Java, Symbian, etc. and using selected SMS ports at the mobile station. This scheme relies in the best case on nothing but end user cell capabilities and minimizes network operator involvement. Further, an application server such as the application server 610 could be completely application agnostic and allow third party developers to be accessed to provide various services to be shared by multiple users, wherein always updated service related information is kept and managed by the application server.

In the following, a specific implementation example illustrating a wireless communication system is discussed with respect to FIG. 7.

Figure 7:
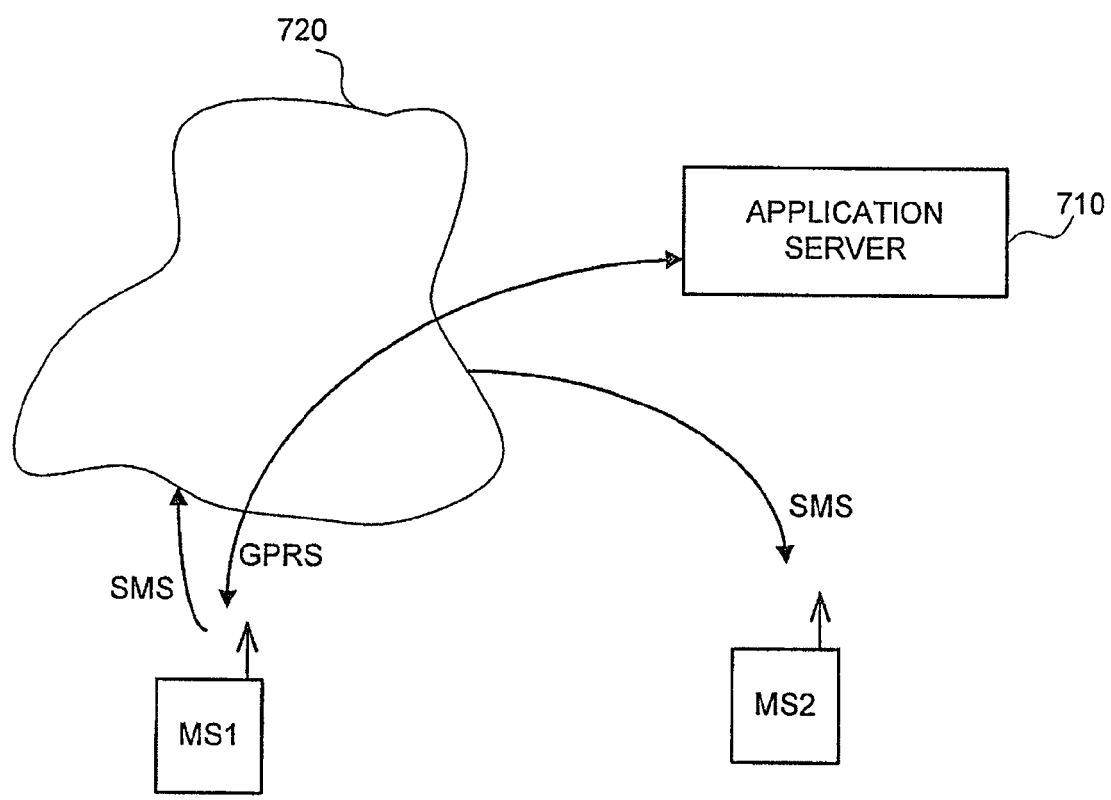
FIG. 7 illustrates a wireless communication system describing different communication types in detail.

In FIG. 7 an application server 710 and a public land mobile network (PLMN) 720 as well as two mobile stations MS1 and MS2 are shown. The PLMN comprises all elements necessary for GSM and/or GPRS communication, such as one or more MSC, a visiting location register (VLR), an SGSN and a SMSC, etc. FIG. 7 illustrates, in particular, the differences between mobile station to mobile station communication and between mobile station to application server communication.

For mobile station to mobile station communication, sending and receiving SMS messages is preferably used in the above described embodiments, whereas for mobile station to application server communication, packet-switched network communication, e.g. IP based, is preferably used. In packet-switched network communication, an application of a mobile station, such as of MS1, may be connected to the application server 710 and data flow in both directions may be established. For example, in GPRS, which is a packet-oriented mobile data service available to users of mobile stations of the GSM standard, packets are sent in both directions. However, the embodiments are not limited to GPRS communication or other types of packet-switched communications, but preferably the application server connects to a mobile station and the mobile station is able to access information on the application server.

Therefore, a mobile station, an application server and a wireless communication system may be provided for improved distribution of service related information.

In the above description, it should be understood that the determining unit and providing unit of the application server, for example, or the SMS mailer or controller of the mobile station may be largely realized by a microprocessor or integrated circuit in the application server or mobile station, respectively, and they are not limited to the above.

For example, these elements may be realized by a hardware arrangement, such as by hardwired circuits, or ASICs (application specific integrated circuits), or software or any suitable combination of the above. For example, the determining unit and the providing unit and their functions may be integrated in one unit together with some kind of controller, wherein their functions may be embodied as a software program. Therefore, the term "unit" in the above described embodiments should not be construed as limiting the individual elements to a separate tangible part of the application server but should be understood as a kind of functional entity.

Furthermore, several functions of the application server may be incorporated in a control unit comprising or being connected to a memory, such as a RAM, ROM, hard disk, (E)EPROM, a disk, a flash memory, etc. A program code stored in the memory may be a program including instructions adapted to cause a processor in the control unit to carry out the operations of the application server described above.

Similarly, also functions, such as the functions of the SMS mailer, the selector or the controller of the mobile station, may be provided by a control unit of the mobile station which may comprise or be connected to a memory, such as one of the memories described above. A program code stored in the memory may be a program including instructions adapted to cause a processor in the control unit to carry out the operations of the mobile station described above.

In other words, a program may be provided including instructions adapted to cause a processor, such as the processor of the control unit of the application server or of the mobile station, to carry out combinations of the above described operations.

Moreover, a computer readable medium may be provided in which the program is embodied. The computer readable medium may be tangible, such as a disk or other data carrier or may be intangible, constituted by signals suitable for electronic, optic or any other type of transmission. A computer program product may comprise the computer readable medium and when loaded into a program memory of a computer, processor or microcontroller causes the processor or microcontroller to carry out the above described operations.

As described above, embodiments and examples of the invention allow for notifying one or several mobile stations of service related information without relying on a single source as sender. Therefore, the invention may provide a simple solution to control notifications so as to divide load and costs in the communication system.

In addition to the foregoing, embodiments in accordance with the invention may comprise, for example, one or more of the following:

1. A mobile station for use in a communication network comprising an application server for providing a service to a group of mobile stations in said communication network, said mobile station comprising an application associated with said service, said mobile station further comprising
   a communication section adapted to receive from said application server at least one address of at least one second mobile station of said group, in which second mobile station an application associated with said service is inactive; and
   an SMS mailer adapted to cause a short message service, SMS, message to be addressed to said at least one second mobile station to start on said at least one second mobile station the inactive application associated with said service upon receipt of said SMS message.

2. The mobile station of 1, wherein
   said communication section is adapted to receive at least one of said at least one address and service related information via a packet switched network communication between the mobile station and said application server.

3. The mobile station of 2, wherein
   the packet switched network communication between the mobile station and said application server is configured to connect said application of said mobile station to said application server.

4. The mobile station of 2 or 3, wherein
   said SMS mailer is adapted to receive an SMS message configured to start the application of the mobile station to enable said mobile station to use packet switched network communication with said application server to obtain at least one of said at least one address and said service related information from said application server.

5. The mobile station of one of 1 to 4, wherein
   said communication section is adapted to transmit service related information to said application server 6. The mobile station of at least one of 1 to 5, wherein
said communication section is adapted to receive from said application server a plurality of addresses of mobile stations of said group, in which plurality of mobile stations an application associated with said service is inactive; and the mobile station further comprising
a selector for selecting from said plurality of addresses an address of a mobile station of said plurality of mobile stations;
wherein said selected address corresponds to said address of said second mobile station.

7. The mobile station of 6, wherein
said SMS mailer is adapted to cause an SMS message comprising said plurality of addresses of mobile stations without said selected address to be sent to said second mobile station.

8. The mobile station of at least one of 1 to 5, wherein
said communication section is adapted to receive from said application server at least two addresses of said at least second and a third mobile station of said group, in which second and third mobile stations the application is inactive, and
said SMS mailer is adapted to cause said SMS message to be addressed to said at least second and third mobile stations according to said at least two addresses to start on said at least second and third mobile stations the applications associated with said service.

9. The mobile station of at least one of 1 to 8, wherein
said SMS message comprises service related information managed by the application server.

10. The mobile station of at least one of 1 to 9, wherein
said SMS message is a SMS control message comprising control information for starting said application upon receipt of the message.

11. The mobile station of at least one of 1 to 10, wherein
said application is connectable to said application server to provide for a client server communication via a packet switched network.

12. The mobile station of 4, further comprising
a controller adapted to determine whether said received SMS message comprises control information and to load said application in a memory of the mobile station, if control information is present, to start said application.

13. An application server for providing a service to a group of mobile stations in a communication network, said application server comprising
a communicating unit for communicating with an application active on a first mobile station of said group and associated with said service;
a determining unit for determining at least one second mobile station from said group of mobile stations, in which at least one second mobile station an application associated with said service is inactive; and
a providing unit for providing at least one address of said at least one second mobile station to said first mobile station using said communicating unit.

14. The application server of 13, wherein
said communicating unit is adapted to receive service related information and said providing unit is adapted to provide said at least one address in response thereto.

15. The application server of 13 or 14, wherein
said determining unit is adapted to determine the at least one second mobile station based on at least one of a specific protocol, previous active times of an application of a mobile station of said group, number of previously sent SMS messages by a mobile station and distribution of sent SMS messages between the mobile stations of said group.

16. The application server of at least one of 13 to 15, wherein
said communicating unit is adapted to receive a confirmation confirming receipt of said at least one address at said first mobile station, and
said providing unit is adapted to provide said at least one address of said at least one second mobile station to another mobile station using said communicating unit, if no confirmation is received.

17. A wireless communication system, comprising
a mobile station according to at least one of 1 to 12; and
an application server according to at least one of 13 to 16.

18. A method for operating a mobile station in a communication network comprising an application server providing a service to a group of mobile stations, each comprising an application associated with said service, the method comprising
receiving at a first mobile station from said application server at least one address of at least one second mobile station of said group, in which second mobile station the application associated with said service is inactive; and
causing a short message service, SMS, message to be addressed to said at least one second mobile station to start on said at least one second mobile station the inactive application associated with said service upon receipt of said SMS message.

19. The method of 18, further comprising
receiving at least one of said at least one address and service related information via a packet switched network communication between said first mobile station and said application server.

20. The method of 19, further comprising
connecting said application of said first mobile station to said application server using the packet switched network communication.

21. The method of at least one of 18 to 20, further comprising
receiving an SMS message at said first mobile station, and
starting the application of the first mobile station in response to said received SMS message.

22. The method of at least one of 19 or 21, further comprising
starting the application of said at least one second mobile station upon receipt of said SMS message at said second mobile station.

23. The method of at least one of 18 to 22, further comprising
carrying out packet switched network communication between said application server and at least one of the first and second mobile station to connect the application to said application server after starting the application, and
receiving service related information from said application server by using said packet switched network communication.

24. The method of at least one of 18 to 23, further comprising
requesting said application server to send at least one of service related information or said at least one address.

25. The method of at least one of 18 to 24, further comprising
receiving at said first mobile station from said application server at least two addresses of said at least one second mobile station and a third mobile station of said group; and the method further comprising
causing SMS messages to be sent until at least one SMS message has been sent to all received addresses of mobile stations.

26. The method of at least one of 18 to 25, wherein
said SMS message is a SMS control message comprising information for starting said application upon receipt of the message.

27. The method of at least one of 18 to 26, wherein
said application is connectable to said application server to provide for a client server communication via a packet switched network.

28. The method of 21, wherein
starting said application comprises determining whether said received SMS message comprises control information and loading said application in a memory of the first mobile station, if control information is present.

29. A method for operating an application server providing a service to a group of mobile stations in a communication network, said method comprising
communicating with an application active on a first mobile station of said group and associated with said service;
determining at least one second mobile station from said group of mobile stations, in which at least one second mobile station an application associated with said service is inactive; and
providing at least one address of said at least one second mobile station to said first mobile station by communicating with said active application.

30. A method for operating a wireless communication system comprising operating a mobile station according to at least one of 18 to 28 and operating an application server according to 29.

31. A computer program product, which when loaded into program memory of a processor or microcontroller, causes the processor or microcontroller to carry out a method of at least one of 18 to 30.

It will be appreciated that various modifications and variations can be made in the described mobile stations, application servers and wireless communication systems of the invention as well as in the construction of this invention without departing from the scope or spirit of the invention.

The invention has been described in relation to particular embodiments and examples which are intended in all aspects to be illustrative rather than restrictive. Those skilled in the art will appreciate that many different combinations of hardware, software and firmware will be suitable for practicing the invention.

Moreover, other implementations of the invention will be apparent to the skilled person from consideration of the specification and practice of the invention disclosed herein. It is intended that the specification and the examples be considered as exemplary only. To this end, it is to be understood that inventive aspects lie in less than all features of the single foregoing disclosed implementation or configuration. Thus, the true scope and spirit of the invention is indicated by the following claims.

The invention claimed is:

1. A mobile station for use in a communication network comprising an application server for providing a service to a group of mobile stations in said communication network, said mobile station comprising an application associated with said service, said mobile station further comprising
a communication section adapted to receive from said application server at least one address of at least one second mobile station of said group, in which second mobile station an application associated with said service is inactive; and
an SMS mailer adapted to cause a short message service, SMS, message to be addressed to said at least one second mobile station to start on said at least one second mobile station the inactive application associated with said service upon receipt of said SMS message; wherein
said communication section is adapted to receive from said application server a plurality of addresses of mobile stations of said group, in which plurality of mobile stations an application associated with said service is inactive; and the mobile station further comprising
a selector for selecting from said plurality of addresses an address of a mobile station of said plurality of mobile stations;
wherein said selected address corresponds to said address of said second mobile station.

2. The mobile station of claim 1, wherein
said communication section is adapted to receive at least one of said at least one address and service related information via a packet switched network communication between the mobile station and said application server.

3. The mobile station of claim 2, wherein
the packet switched network communication between the mobile station and said application server is configured to connect said application of said mobile station to said application server.

4. The mobile station of claim 3, wherein
said SMS mailer is adapted to receive an SMS message configured to start the application of the mobile station to enable said mobile station to use packet switched network communication with said application server to obtain at least one of said at least one address and said service related information from said application server.

5. The mobile station of claim 1, wherein
said communication section is adapted to transmit service related information to said application server.

6. The mobile station of claim 1, wherein
said SMS mailer is adapted to cause an SMS message comprising said plurality of addresses of mobile stations without said selected address to be sent to said second mobile station.

7. The mobile station of claim 1, wherein
said SMS message comprises service related information managed by the application server.

8. The mobile station of claim 1, wherein
said SMS message is a SMS control message comprising control information for starting said application upon receipt of the message.

9. The mobile station of claim 1, wherein
said application is connectable to said application server to provide for a client server communication via a packet switched network.

10. The mobile station of claim 4, further comprising
a controller adapted to determine whether said received SMS message comprises control information and to load said application in a memory of the mobile station, if control information is present, to start said application.

11. An application server for providing a service to a group of mobile stations in a communication network, said application server comprising
 a communicating unit for communicating with an application active on a first mobile station of said group and associated with said service;
 a determining unit for determining at least one second mobile station from said group of mobile stations, in which at least one second mobile station an application associated with said service is inactive; and
 a providing unit for providing at least one address of said at least one second mobile station to said first mobile station using said communicating unit; wherein
 said communicating unit is adapted to communicate to said application on the first mobile station a plurality of addresses of mobile stations of said group, in which plurality of mobile stations an application associated with said service is inactive; and wherein the first mobile station selects an address corresponding to an address of one of the plurality of said mobile stations of said group.

12. The application server of claim 11, wherein
 said communicating unit is adapted to receive service related information and said providing unit is adapted to provide said at least one address in response thereto.

13. The application server of claim 11, wherein
 said determining unit is adapted to determine the at least one second mobile station based on at least one of a specific protocol, previous active times of an application of a mobile station of said group, number of previously sent SMS messages by a mobile station and distribution of sent SMS messages between the mobile stations of said group.

14. The application server of claim 11, wherein
 said communicating unit is adapted to receive a confirmation confirming receipt of said at least one address at said first mobile station, and
 said providing unit is adapted to provide said at least one address of said at least one second mobile station to another mobile station using said communicating unit, if no confirmation is received.

15. A wireless communication system, comprising
 a mobile station for use in a communication network comprising an application server for providing a service to a group of mobile stations in said communication network, said mobile station comprising an application associated with said service, said mobile station further comprising
 a communication section adapted to receive from said application server at least one address of at least one second mobile station of said group, in which second mobile station an application associated with said service is inactive; and
 an SMS mailer adapted to cause a short message service, SMS, message to be addressed to said at least one second mobile station to start on said at least one second mobile station the inactive application associated with said service upon receipt of said SMS message; wherein
 said communication section is adapted to receive from said application server a plurality of addresses of mobile stations of said group, in which plurality of mobile stations an application associated with said service is inactive; and the mobile station further comprising
 selector for selecting from said plurality of addresses an address of a mobile station of said plurality of mobile stations;
 wherein said selected address corresponds to said address of said second mobile station; and the application server, for providing a service to a group of mobile stations in a communication network, said application server comprising
 a communicating unit for communicating with an application active on a first mobile station of said group and associated with said service;
 a determining unit for determining at least one second mobile station from said group of mobile stations, in which at least one second mobile station an application associated with said service is inactive; and
 a providing unit for providing at least one address of said at least one second mobile station to said first mobile station using said communicating unit.

16. A method for operating a mobile station in a communication network comprising an application server providing a service to a group of mobile stations, each comprising an application associated with said service, the method comprising
 receiving at a first mobile station from said application server at least one address of at least one second mobile station of said group, in which second mobile station the application associated with said service is inactive; and
 causing a short message service, SMS, message to be addressed to said at least one second mobile station to start on said at least one second mobile station the inactive application associated with said service upon receipt of said SMS message; wherein
 the first mobile station receives from said application server a plurality of addresses of mobile stations of said group, in which plurality of mobile stations an application associated with said service is inactive; and further comprising
 selecting from said plurality of addresses an address of a mobile station of said plurality of mobile stations;
 wherein said selected address corresponds to said address of said second mobile station.

17. The method of claim 16, further comprising
 receiving at least one of said at least one address and service related information via a packet switched network communication between said first mobile station and said application server.

18. The method of claim 17, further comprising
 connecting said application of said first mobile station to said application server using the packet switched network communication.

19. The method of claim 16, further comprising
 receiving an SMS message at said first mobile station, and
 starting the application of the first mobile station in response to said received SMS message.

20. The method of claim 17, further comprising
 starting the application of said at least one second mobile station upon receipt of said SMS message at said second mobile station.

21. The method of claim 16, further comprising
 carrying out packet switched network communication between said application server and at least one of the first and second mobile station to connect the application to said application server after starting the application, and
 receiving service related information from said application server by using said packet switched network communication.

22. The method of claim 16, further comprising
 requesting said application server to send at least one of service related information or said at least one address.

23. The method of claim 16, further comprising
receiving at said first mobile station from said application server at least two addresses of said at least one second mobile station and a third mobile station of said group; and the method further comprising
causing SMS messages to be sent until at least one SMS message has been sent to all received addresses of mobile stations.

24. The method of claim 16, wherein
said SMS message is a SMS control message comprising information for starting said application upon receipt of the message.

25. The method of claim 16, wherein
said application is connectable to said application server to provide for a client server communication via a packet switched network.

26. The method of claim 19, wherein
starting said application comprises determining whether said received SMS message comprises control information and loading said application in a memory of the first mobile station, if control information is present.

27. A method for operating an application server providing a service to a group of mobile stations in a communication network, said method comprising
communicating with an application active on a first mobile station of said group and associated with said service;
determining at least one second mobile station from said group of mobile stations, in which at least one second mobile station an application associated with said service is inactive; and
providing at least one address of said at least one second mobile station to said first mobile station by communicating with said active application; wherein
communicating to said application on the first mobile station includes communicating a plurality of addresses of mobile stations of said group, in which plurality of mobile stations an application associated with said service is inactive; wherein the first mobile station selects an address corresponding to an address of one of the plurality of mobile stations of said group.

28. A method for operating a wireless communication system comprising operating a mobile station in a communication network comprising an application server providing a service to a group of mobile stations, each comprising an application associated with said service, the method comprising
receiving at a first mobile station from said application server at least one address of at least one second mobile station of said group, in which second mobile station the application associated with said service is inactive; and
causing a short message service, SMS, message to be addressed to said at least one second mobile station to start on said at least one second mobile station the inactive application associated with said service upon receipt of said SMS message; wherein
the first mobile station receives from said application server a plurality of addresses of mobile stations of said group, in which plurality of mobile stations an application associated with said service is inactive; and further comprising
selecting from said plurality of addresses an address of a mobile station of said plurality of mobile stations;
wherein said selected address corresponds to said address of said second mobile station, and
operating an application server providing a service to a group of mobile stations in a communication network, said method comprising
communicating with an application active on a first mobile station of said group and associated with said service;
determining at least one second mobile station from said group of mobile stations, in which at least one second mobile station an application associated with said service is inactive; and
providing at least one address of said at least one second mobile station to said first mobile station by communicating with said active application.

29. A non-transitory computer readable medium storing a computer program product, which when a processor or microcontroller, causes the processor or microcontroller to carry out a method of claim 16.

30. A mobile station for use in a communication network comprising an application server for providing a service to a group of mobile stations in said communication network, said mobile station comprising an application associated with said service, said mobile station further comprising
a communication section adapted to receive from said application server at least one address of at least one second mobile station of said group, in which second mobile station an application associated with said service is inactive; and
an SMS mailer adapted to cause a short message service, SMS, message to be addressed to said at least one second mobile station to start on said at least one second mobile station the inactive application associated with said service upon receipt of said SMS message; wherein
said communication section is adapted to receive from said application server at least two addresses of said at least second and a third mobile station of said group, in which second and third mobile stations the application is inactive, and
said SMS mailer is adapted to cause said SMS message to be addressed to said at least second and third mobile stations according to said at least two addresses to start on said at least second and third mobile stations the applications associated with said service.

31. An application server for providing a service to a group of mobile stations in a communication network, said application server comprising
a communicating unit for communicating with an application active on a first mobile station of said group and associated with said service;
a determining unit for determining at least one second mobile station from said group of mobile stations, in which at least one second mobile station an application associated with said service is inactive; and
a providing unit for providing at least one address of said at least one second mobile station to said first mobile station using said communicating unit, wherein
said communicating unit is adapted to communicate to said application on the first mobile station at least two addresses of said at least second and a third mobile station of said group, in which second and third mobile stations the application is inactive to start on said at least second and third mobile stations the applications associated with said service.

32. A wireless communication system, comprising
a mobile station for use in a communication network comprising an application server for providing a service to a group of mobile stations in said communication network, said mobile station comprising an application associated with said service, said mobile station further comprising
a communication section adapted to receive from said application server at least one address of at least one second mobile station of said group, in which second mobile station an application associated with said service is inactive; and an SMS mailer adapted to cause a short message service, SMS, message to be addressed to said at least one second mobile station to start on said at least one second mobile station the inactive application associated with said service upon receipt of said SMS message; wherein said communication section is adapted to receive from said application server at least two addresses of said at least second and a third mobile station of said group, in which second and third mobile stations the application is inactive, and said SMS mailer is adapted to cause said SMS message to be addressed to said at least second and third mobile stations according to said at least two addresses to start on said at least second and third mobile stations the applications associated with said service; and the application server, for providing a service to a group of mobile stations in a communication network, said application server comprising a communicating unit for communicating with an application active on a first mobile station of said group and associated with said service;

a determining unit for determining at least one second mobile station from said group of mobile stations, in which at least one second mobile station an application associated with said service is inactive; and a providing unit for providing at least one address of said at least one second mobile station to said first mobile station using said communicating unit.

33. A method for operating a mobile station in a communication network comprising an application server providing a service to a group of mobile stations, each comprising an application associated with said service, the method comprising receiving at a first mobile station from said application server at least one address of at least one second mobile station of said group, in which second mobile station the application associated with said service is inactive; and causing a short message service, SMS, message to be addressed to said at least one second mobile station to start on said at least one second mobile station the inactive application associated with said service upon receipt of said SMS message; wherein the first mobile station receives from said application server at least two addresses of said at least second and a third mobile station of said group, in which second and third mobile stations the application is inactive, and said SMS message is caused to be addressed to said at least second and third mobile stations according to said at least two addresses to start on said at least second and third mobile stations the applications associated with said service.

34. A method for operating an application server providing a service to a group of mobile stations in a communication network, said method comprising communicating with an application active on a first mobile station of said group and associated with said service;

determining at least one second mobile station from said group of mobile stations, in which at least one second mobile station an application associated with said service is inactive; and providing at least one address of said at least one second mobile station to said first mobile station by communicating with said active application; wherein said communicating with said application on the first mobile station includes communicating at least two addresses of said at least second and a third mobile station of said group, in which second and third mobile stations the application is inactive to start on said at least second and third mobile stations the applications associated with said service.

35. A method for operating a wireless communication system comprising operating a mobile station in a communication network comprising an application server providing a service to a group of mobile stations, each comprising an application associated with said service, the method comprising receiving at a first mobile station from said application server at least one address of at least one second mobile station of said group, in which second mobile station the application associated with said service is inactive; and causing a short message service, SMS, message to be addressed to said at least one second mobile station to start on said at least one second mobile station the inactive application associated with said service upon receipt of said SMS message; wherein the first mobile station receives from said application server at least two addresses of said at least second and a third mobile station of said group, in which second and third mobile stations the application is inactive, and said SMS message is caused to be addressed to said at least second and third mobile stations according to said at least two addresses to start on said at least second and third mobile stations the applications associated with said service; and operating an application server providing a service to a group of mobile stations in a communication network, said method comprising communicating with an application active on a first mobile station of said group and associated with said service;

determining at least one second mobile station from said group of mobile stations, in which at least one second mobile station an application associated with said service is inactive; and providing at least one address of said at least one second mobile station to said first mobile station by communicating with said active application.

* * * * *